May 25, 1943.　　　　W. H. TANKE　　　　2,320,057
TRACTOR MOWER
Filed April 11, 1938　　　5 Sheets-Sheet 1

Fig. 1

Inventor
W. H. Tanke
by
Attorney

May 25, 1943. W. H. TANKE 2,320,057
TRACTOR MOWER
Filed April 11, 1938 5 Sheets-Sheet 2

May 25, 1943. W. H. TANKE 2,320,057
TRACTOR MOWER
Filed April 11, 1938 5 Sheets-Sheet 4

Inventor
W. H. Tanke
by
Attorney

May 25, 1943. W. H. TANKE 2,320,057
TRACTOR MOWER
Filed April 11, 1938 5 Sheets-Sheet 5

Fig. 9

Inventor
W. H. Tanke
by
Attorney

Patented May 25, 1943

2,320,057

UNITED STATES PATENT OFFICE 2,320,057

TRACTOR MOWER

Willard H. Tanke, La Crosse, Wis., assignor to Allis-Chalmers Manufacturing Company, Milwaukee, Wis., a corporation of Delaware Application April 11, 1938, Serial No. 201,262

38 Claims. (Cl. 56—25)

The invention relates to implement attachments for tractors and it is concerned more specifically with an improved tractor mower.

It is an object of the invention to convert an ordinary wheeled tractor into a mowing machine with a minimum of time and labor and likewise to reduce the time and labor required to make the tractor again available for other uses after it is no longer used for mowing. More specifically, it is an object of the invention to provide a mower structure comprising a unitary frame, which may be readily mounted on and removed from a tractor.

Another object of the invention is to convert a wheeled tractor into a mowing machine which is easy to handle and in which the driver has a good view of the cutting mechanism at all times.

A further object of the invention is to provide improved mechanism to protect a mowing machine against damage in case the cutting mechanism is driven against an obstruction, such as a large stone or a tree stump, or in case a wire or other obstruction becomes entangled in the cutting mechanism.

A further object of the invention is to precisely adjust the cutting mechanism to a predetermined working position and to precisely aline the cutting mechanism with its drive mechanism.

A still further object of the invention is to provide a mowing attachment for a tractor which is simple and compact in construction, efficient in operation, and which may be manufactured at low costs.

These and other objects and advantages of the invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

Referring to the drawings.

Figure 1:
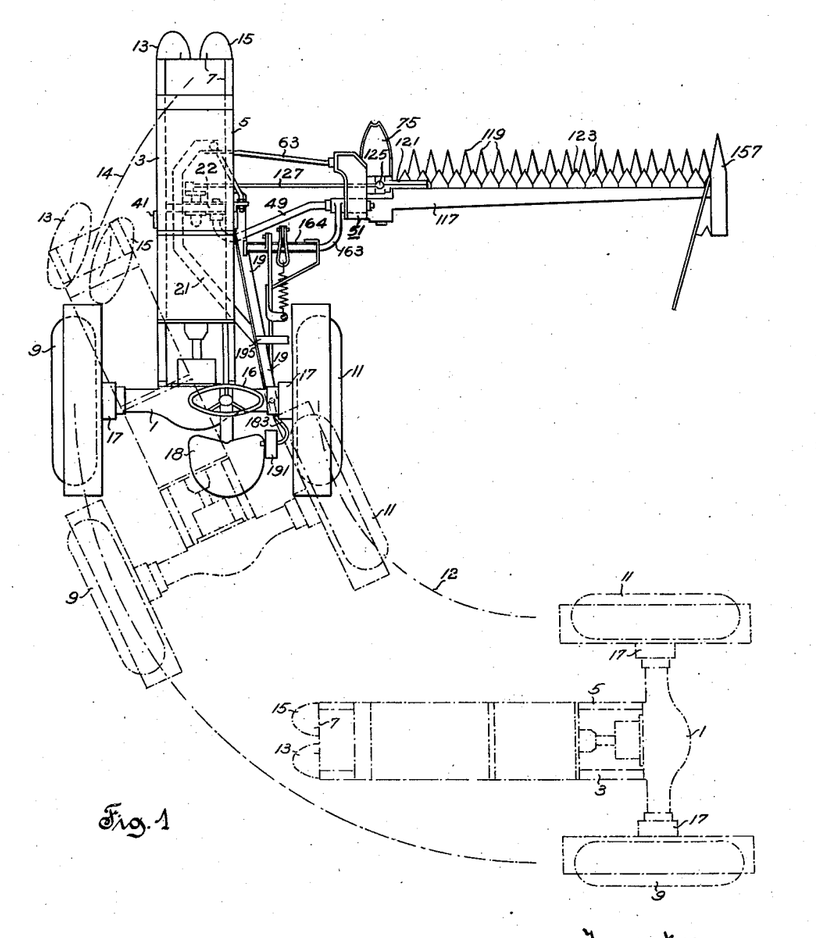
Fig. 1 is a diagrammatic view of a tractor and a mowing attachment therefor, illustrating the mode of connecting and disconnecting the attachment and the tractor.

Referring to Fig. 1 of the drawings, the tractor and the mowing attachment connected therewith are shown in full lines in the upper part of the figure, and the tractor per se is shown disconnected from the attachment in two different positions indicated by dash-dotted lines. As shown in the upper part of Fig. 1, the tractor comprises a rear axle housing 1 to which are secured forwardly extending side channels 3 and 5, the front ends of the side channels being secured to a steering gear housing 7. A power plant (not shown), including a motor, clutch and transmission mechanisms, are mounted between the side channels, as is usual in tractor design, and a more detailed description in this connection is believed unnecessary. For the purposes of the present disclosure it will suffice to say that the side channels and tractor parts mounted thereon constitute the body of the tractor, which is supported at its rear on a pair of transversely spaced rear wheels 9 and 11, and at its front end on a pair of closely adjacent steerable front wheels 13 and 15. The rear wheels are mounted on final drive casings 17 (Figs. 1 and 3) and the front wheels are mounted on a vertically extending support (not shown) at the under side of the steering gear housing 7, so as to afford a relatively high ground clearance of the body, as is the usual practice in farm tractors. A driver's seat at the rear of the tractor is indicated by the reference character 18, and wherever hereinafter the terms "right" and "left" are used they are to be understood as by a driver seated on the seat 18 and looking towards the front end of the tractor. A steering wheel 16 in front of the driver's seat is operatively connected by suitable shafting and gearing (not shown) with the steerable front wheels 13, 15. For a fuller disclosure of the tractor shown herein reference is made to United States Patent 2,073,613, March 16, 1937, C. E. Frudden and Walter F. Strehlow, Motor vehicle.

Figures 2, 5:
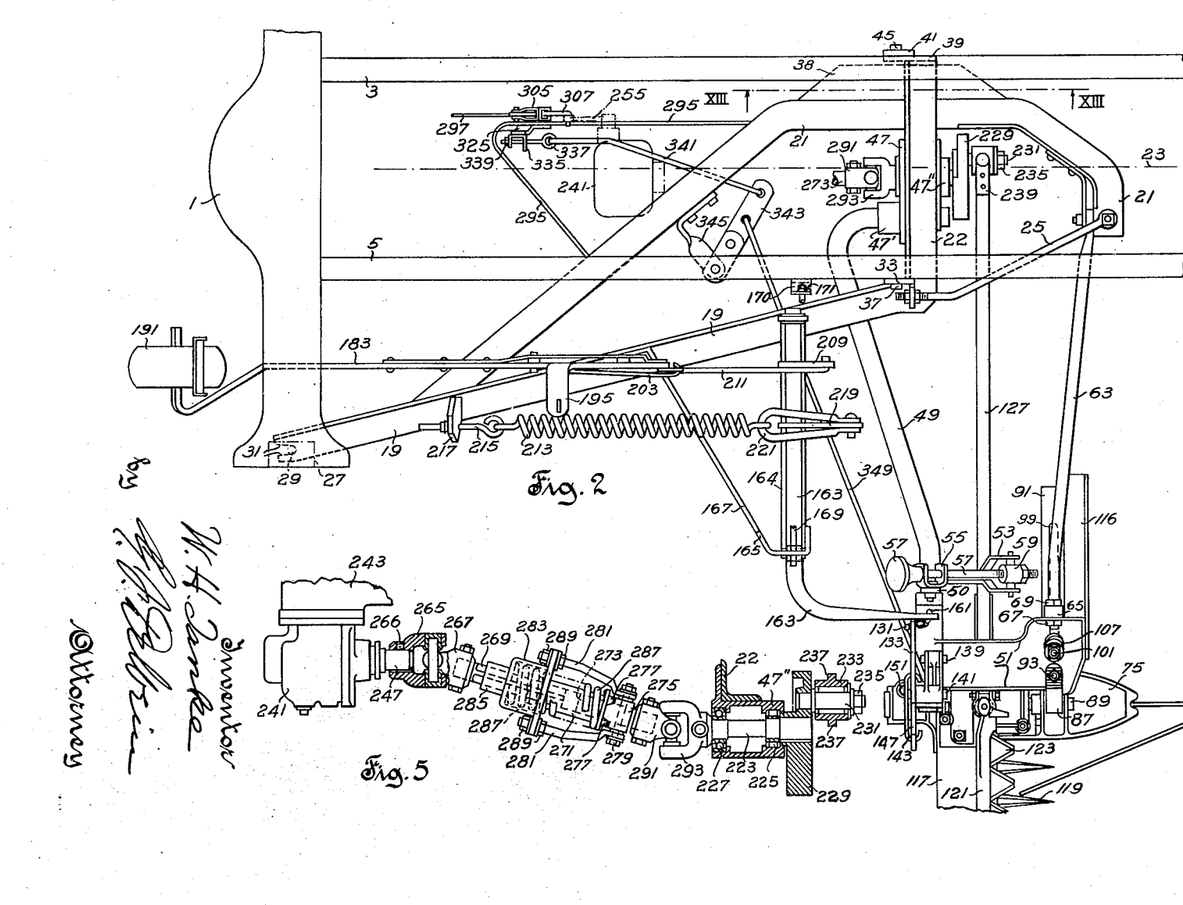
Fig. 2 is a top view of the mowing attachment, part of the tractor being indicated in light full lines.
Fig. 5 is a side view, partly in section, of the drive assembly below the tractor.
Figures 3, 4, 10, 13:
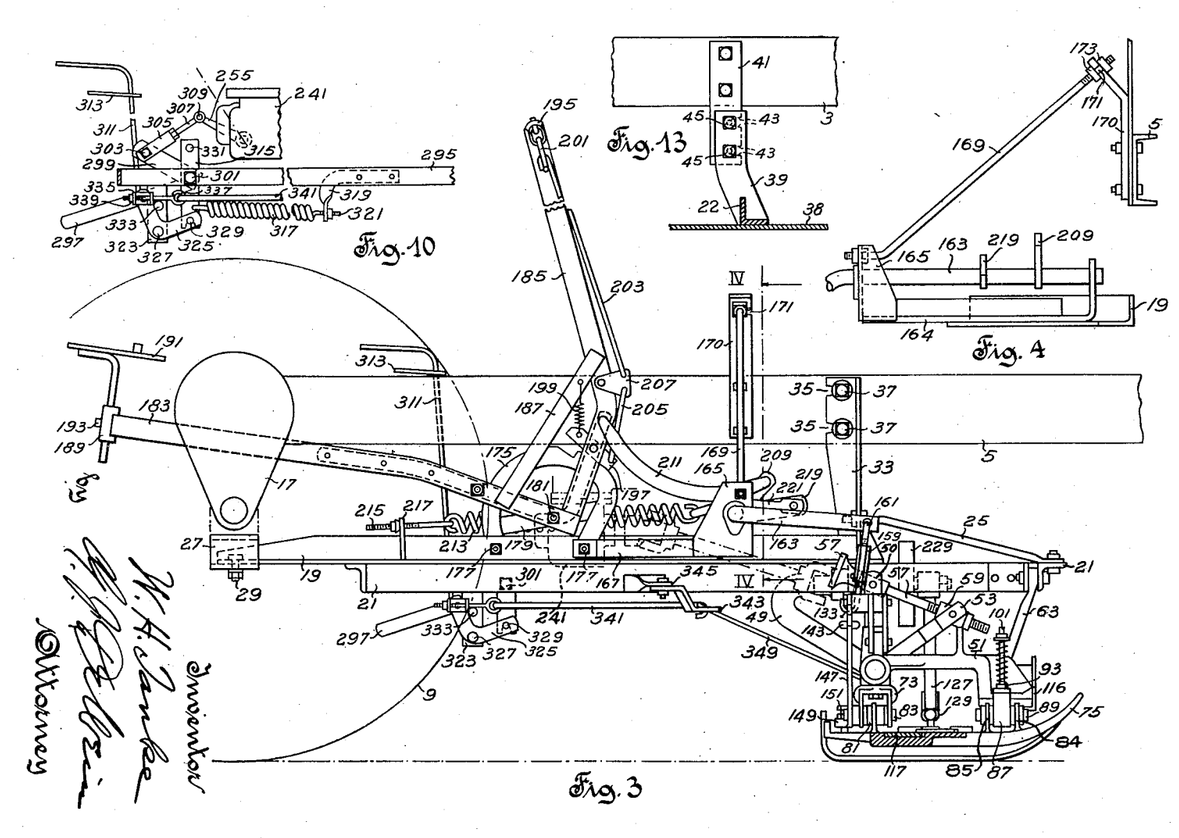
Fig. 3 is a side view, partly in section, of the mowing attachment, looking from the cutter bar towards the tractor, part of the tractor being indicated in light full lines.
Fig. 4 is a detail view of a supporting connection between the attachment and tractor, the view being taken on line IV—IV of Fig. 3.
Fig. 10 is a side view of the power take-off throw-out assembly below the tractor.
Fig. 13 is a detail view on line XIII—XIII of Fig. 2.

Underlying the body of the tractor is a rigid frame structure comprising a substantially straight angle iron 19, a bent angle iron 21 welded at its rear end to the angle iron 19, and an angle iron cross member 22 connecting the front end of the angle iron 19 with the opposite portion of the angle iron 21. The dash-dotted line 23 in Fig. 2 indicates a vertical plane extending centrally of the wheeled front support of the tractor transversely of the rear axle housing 1, and it will be noted that the left angle iron 21 extends in a horizontal plane forwardly from its rearward connection with the angle iron 19 in an inclined direction beyond said vertical plane, and that a portion of the angle iron 21 forwardly of the cross member 22 extends in a forwardly inclined direction towards said vertical plane. The extreme forward end of the angle iron 21 extends transversely of the plane 23 and has a bracing connection 25 with the angle iron 19 at the right side of the plane 23. The rigid frame 19, 21, 22 is suspended at its rear on one of the final drive housings 17 by means of a bracket 27 which is secured to the lower end of the housing 17 at the right side of the tractor. The bracket 27 has the form of a square U, one leg of which is secured to the housing 17, and the other leg of which has a hole for the reception of a bolt 29, the closed end of the U facing the wheel 11, and the open end facing the wheel 9. The horizontal leg of the angle iron 19 rests on the lower leg of the bracket 27 and has a slotted opening 31 engaging the bolt 29, and by tightening a nut on the bolt 29 the bracket 27 and angle iron 19 may be secured together. Rigidly secured to the forward end of the angle iron 19, as by welding, is a hanger 33 with slotted openings 35 engaging two bolts 37 on the right side channel 5 of the tractor. At the left side of the frame a plate 38 is welded to the horizontal flange of the frame angle 21 and to an overhanging portion of the cross member 22, and a hanger 39 is secured to the left end of the cross member 22, the hanger 39 terminating below the side channel 3 of the tractor, as shown in Fig. 13. Bolted to the outer side of the side channel 3 is a depending strap 41 overlapping the upper end of the hanger 39, the strap 41 having slotted openings 43 engaging bolts 45 on the hanger 39. In order to secure the hangers 33 and 39 to the tractor nuts on the bolts 37 and 45 may be tightened, and it will be noted that after loosening the nuts on the bolts 29, 37 and 45 the frame may be pulled forwardly, whereupon the hangers 33 and 39 will first drop from the tractor while the rear end of the angle iron 19 slides forwardly on the bracket 27 without dropping from this bracket. By continued forward pull on the frame the angle iron 19 may be caused to drop from the bracket 27. On the other hand, in order to attach the frame to the tractor, the rear end of the angle iron 19 may first be lifted upon the bracket 27 and the front end may then be lifted to aline the slotted openings 35 and 43 with the bolts 37 and 45, and by rearward push on the frame the hangers 33 and 39 may be engaged with the bolts 37 and 45.

Figures 6, 7, 8, 11, 12:
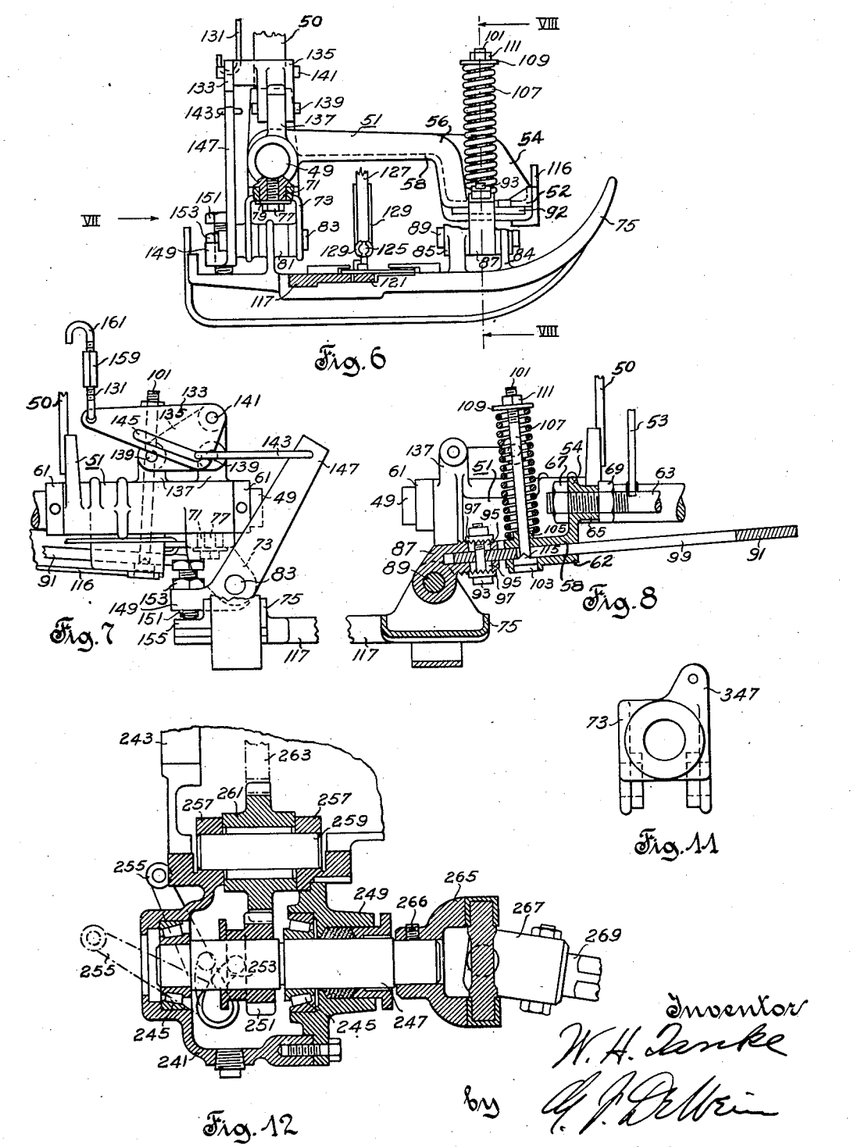
Fig. 6 is an enlarged side view of the cutter bar support, the view being taken in the same direction as Fig. 3 and part of the universal connection at the rear end of the cutter bar shoe being shown in section.
Fig. 7 is an end view of the cutter bar support shown in Fig. 6, the view being taken in the direction of the arrow VII in Fig. 6.
Fig. 8 is a sectional view on line VIII—VIII of Fig. 6.
Fig. 11 is a top view of the rear hanger for the cutter bar.
Fig. 12 is a longitudinal vertical section through the power take-off mechanism at the under side of the tractor.
Figure 9:
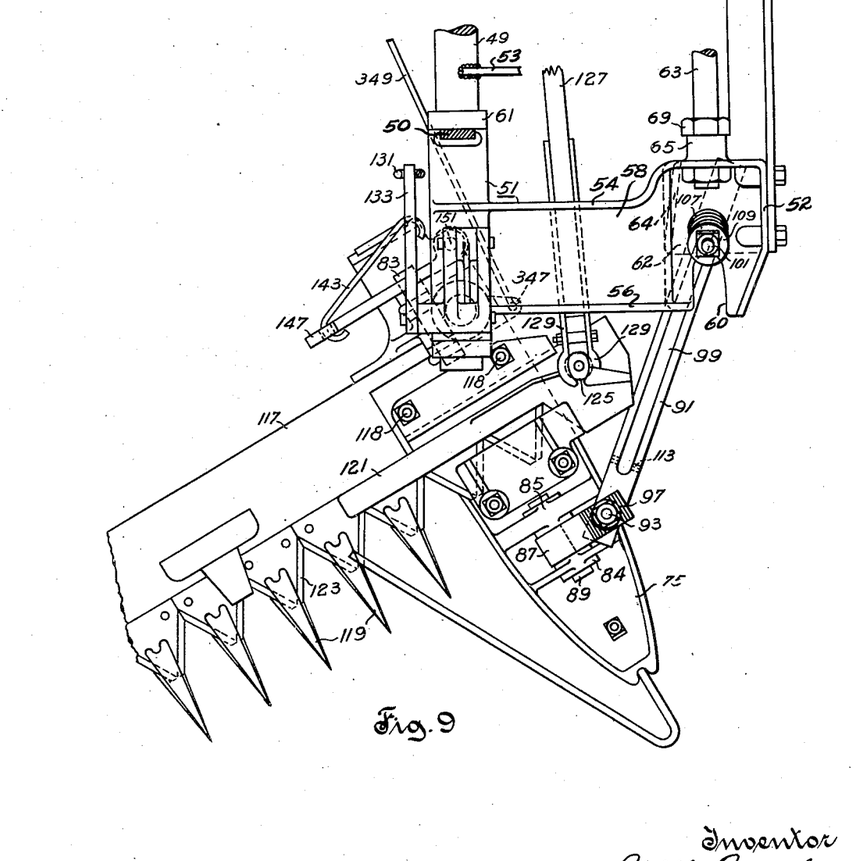
Fig. 9 is a top view of the cutter bar support with the cutter bar shown in non-working position.

Mounted on and in position below the cross member 22 is a bearing housing 47 (Fig. 2) having a right bearing portion 47' and a left bearing portion 47'' arranged side by side and extending longitudinally of the tractor. Journaled in the right bearing portion 47' of the housing 47 is a drag arm 49 the arm being bent to extend transversely of the frame 19, 21, 22 and of such length that its outer end lies beyond the rear wheel 11 of the tractor. Pivotally mounted on the outer end of the arm 49 is a cutter bar yoke 51, the yoke being tiltably adjustable on the arm 49 by means of a tilting mechanism comprising a bifurcated extension 53 welded to the arm 49, as shown in Figs. 8 and 9; a tilting screw bracket 55 mounted on an upwardly extending arm 50 of the yoke 51; a tilting screw 57 journaled in the bracket 55; and a tilting screw nut 59 mounted in the bifurcated part of the extension 53 and cooperating with the screw 57. Set collars 61, shown in Fig. 7, retain the yoke 51 in fixed position axially of the arm 49 and permit adjustment of the yoke in and out with respect to the tractor. A pull brace 63 is pivotally mounted on the forward end of the frame angle 21 for rotation about the same horizontal axis as the arm 49. The outer end of the pull brace 63 extends through a lug 65 on the yoke 51, the brace being threaded and carrying a nut 67 at one side of the lug 65 and another nut 69 at the other side of the lug 65. The nuts 67 and 69 are drawn up against the lug 65 so that the brace 63 will cooperate with the arm 49 to secure the yoke against displacement longitudinally of the frame.

Integrally formed with the cutter bar yoke 51, on a portion thereof below the arm 49, is a short pivot lug 71, shown in Figs. 6 and 7, whose axis extends vertically at right angles to the axis on which the cutter bar yoke 51 is tiltable on the arm 49 by means of the tilting screw 57. Mounted on the pivot lug 71 is a rear hanger 73 of a cutter bar shoe 75, and the pivot lug has an axial hole which is threaded to receive a bolt 77. The bolt 77 retains a washer 79 to hold the rear hanger 73 in place on the pivot lug 71. Fitted between two arms of the rear hanger 73 is an upwardly projecting bearing lug 81 of the cutter bar shoe 75, the bearing lug and arms being pivotally connected by a pin 83 extending horizontally and in the longitudinal direction of the shoe 75. Forwardly of the bearing lug 81 the shoe has two upwardly extending bearing lugs 84 and 85 between which a front hanger 87 is pivotally mounted by means of a pin 89 extending coaxially with the pin 83. Referring to Fig. 8, it will be seen that the front hanger 87 has a forked lateral extension on which a strap 91 is pivoted by means of a bolt 93 extending through a round hole in the strap 91 and through elongated holes 95 in the arms of the extension of hanger 87. The extension of hanger 87 has serrations on its upper and lower sides, and similarly serrated washers 97 are inserted between the head and nut of bolt 93 whereby the strap 91 may be secured to the hanger 87 in different positions of adjustment transversely of the axis of pin 89. In any position of adjustment of the bolt 93 the strap 91 has pivotal movement about the bolt 93. The strap 91 extends through the yoke 51, the latter having a rectangular opening 92, shown in Fig. 6, through which the strap 91 extends, as shown in Figs. 7 and 8.

In Fig. 6 the upper parts of the lugs 84 and 85 of the shoe 75 are broken away to show the construction of the forward part of the yoke 51 in which the opening 92 is formed. At its forward end the yoke has a transverse upstanding flange 52 which, as shown in Fig. 9, has a portion substantially parallel to the pivot axis of the yoke on the arm 49, and a rearwardly inclined portion extending towards the cutter bar side of the yoke. At the side of the yoke remote from the cutter bar the transverse flange 52 merges with a side flange 54, a forward portion of which extends upwardly and rearwardly at substantially right angles to the pivot axis of the yoke on the arm 49. Another portion of the flange 54 which is offset from said forward portion towards the cuter bar side of the yoke merges with a sleeve portion of the yoke which embraces the outer end of the arm 49. At the cutter bar side of the yoke a second flange 56 merges with the sleeve portion of the yoke and extends in a vertical plane at right angles to the pivot axis of the yoke on the arm 49. The flange 56 has a downwardly inclined forward portion the rear edge of which is transversely alined with the rear edge of the upwardly and rearwardly inclined forward portion of the flange 54. and the flanges 54 and 56 are connected by a web 58 shown in Figs. 6 and 9. The web 58 merges with the sleeve portion of the yoke and extends along the bottom edges of the flanges 54 and 56, the web extending first forwardly from the sleeve portion in a plane through the axis of the latter and then downwardly from said plane at a slight forward inclination, as shown in Fig. 6. The forward portions of the flanges 54 and 56 are connected at their lower ends by a forward extension of the web 58 which also merges with the transverse flange 52 and has a cut-out 60 at the cutter bar side of the yoke. The forward extension of the web 58 is disposed below and at a slight angle to the mentioned plane through the pivot axis of the yoke on the arm 49, the plane of the extension being downwardly inclined towards the cutter bar side of the yoke, as best shown in Fig. 8. At the under side of the laterally inclined forward extension of the web 58 a flat box is formed integrally with the yoke, the box having top, bottom, front and rear walls, the inner surfaces of which define the rectangular opening 92 for the strap 91. The top wall of the box is formed by the forward, laterally inclined portion of the web 58, and its bottom wall, which is indicated by the reference character 62 in Figs. 8 and 9, extends parallel to said top wall. The width of the box transversely of the yoke, or in the direction from the flange 54 towards the flange 56, is somewhat shorter than the spacing of the forward portion of the flange 54 from the vertical plane of the flange 56, the bottom wall 62 having two parallel straight edges extending longitudinally of the yoke, one at the side of the yoke remote from the cutter bar and underlying the forward portion of the flange 54; and another underlying an intermediate portion of the forward extension of the web 58, as shown in Figs. 8 and 9. The front wall of the flat box which forms the opening 92 is of the same length, transversely of the yoke, as the described transverse width of the bottom wall 62 and the front wall merges with the forward extension of the web 58 below the portion of the flange 52 which has been described as extending parallel to the pivot axis of the yoke on the arm 49. The front wall of the box likewise extends parallel to said axis and its thickness is approximately equal to the thickness of flange 52, as shown in Fig. 6. The rear wall of the box, which connects the bottom wall 62 with the forward extension of the web 58, is indicated in Fig. 9 by the reference character 64, and as shown in that figure, the rear wall 64 extends in a vertical plane non-parallel to the vertical plane of the front wall of the box, the spacing between the front and rear walls being somewhat smaller at the side of the box remote from the cutter bar than at the side next to the cutter bar. The rectangular opening 92 for the strap 91 is therefore wider, longitudinally of the yoke, at the cutter bar side of the box than at the side of the box remote from the cutter bar, and Fig. 6 shows the longitudinal width of the opening 92 at the cutter bar side of the box.

The strap 91 is slidably fitted between the upper surface of the bottom wall 62 and the bottom surface of the forward extension of the web 58 so as to be guided by engagement of its upper and lower surfaces with the vertically spaced top and bottom walls of the box. The vertical side surfaces of the strap, however, are not guided by the front and rear walls of the box. The strap 91 has a longitudinal slot 99, and a bolt 101 on the yoke extends through the slot 99 whereby the strap is restrained from free pivotal movement about the bolt 93 on the hanger 87. The bolt 101 has a square head slidably fitted into a square recess 103 in the bottom wall 62 of the box, the round shank portion of the bolt being guided in a boss 105 on the forward extension of the web 58. A coil spring 107 seated around the boss 105 engages a washer 109 retained by a nut 111 at the upper end of the bolt 101. At the under side of the strap 91 near the end of the slot 99 adjacent to bolt 93 a V-shaped notch 113 extends transversely of the slot 99, and V-shaped projections 115 adapted to enter the notch 113 are formed on the head of bolt 101 at the side of the head facing the strap 99. The spring 107 exerts an upward thrust upon bolt 101. and in the position shown in Fig. 8, the strap is therefore releasably locked against sliding movement transversely of the yoke 51, and the shoe 75 is restrained from rotating about the vertical axis of the pivot lug 71 at the rear of yoke 51. The shoe, however, is free to pivot on the common horizontal axis of the pins 83 and 89. An angle iron 116 is bolted to the yoke 51 as a guard for the strap 91. The cutout 60 provides a space in the forward extension of the web 58 to accommodate the forked lateral extension of the hanger 87 when the strap 91 is locked on the yoke by means of the bolt 101, as shown in Figs. 2 and 8.

Rigidly connected with the shoe 75 by bolts 118 is a cutter bar 117 of ordinary construction, including guard fingers 119. Reciprocably mounted on the cutter bar is a knife bar 121 including knife sections 123 and a ball element 125 for connection with a pitman 127. The ball 125 is embraced by socket members 129 rigidly mounted on the pitman 127.

The entire cutter bar assembly including the yoke 51, shoe 75 and cutter bar 117 may be raised and lowered about the pivot axis of the arm 49 and brace 63 on the frame 19, 21, 22 by up and down movement of a vertical lifting link 131 best shown in Figs. 6 and 7. The link 131 is hooked to a lifting crank in the form of a plate 133 which is pivotally mounted on a bearing 135 secured to lugs 137 of the cutter bar yoke 51. The bearing 135 is secured to the yoke 51 by pins 139 and carries a pivot pin 141 for the crank plate 133. A link 143 is hooked into a slotted opening 145 of the crank plate 133 and is pivotally connected with a lever 147 mounted on the pivot pin 83. The lever 147 has an arm 149 with a set screw 151 extending therethrough, the set screw being retained in adjusted position by a lock nut 153. The set screw bears against a projection 155 of the cutter bar shoe 75, and it will be seen that upward pull on the link 131 will be transmitted through the crank plate 133, link 143, lever 147 and set screw 151 upon the shoe 75, subjecting the shoe and cutter bar to a tilting force which tends to swing the shoe and cutter bar in an upward direction about the common axis of the pins 83 and 89. Under sufficient pull on link 131 the entire cutter bar assembly will swing upwardly about the pivot axis of the arm 49 and brace 63 on the frame, such upward movement taking place as soon as the downward thrust exerted by the set screw 151 upon the shoe projection 155 overbalances the upward thrust against the set screw due to the weight of the cutter bar. The set screw 151 is so adjusted that upward movement of the shoe 75 at the inner end of the cutter bar will be followed by upward movement of the shoe 157 at the outer end of the cutter bar (Fig. 1) without much delay, that is, the outer shoe 157 will leave the ground only two or three inches behind the inner shoe 75.

The link 131 has a turnbuckle connection 159 (Figs. 7 and 3) with a hook 161 which depends from an arm on lift shaft 163. The lift shaft 163 is journaled on a bracket 164 extending transversely of the frame 19, 21, 22, the bracket having an upturned end portion seated on and welded to the horizontal flange of the angle iron 19, and a bearing plate 165 at the other end, as shown in Figs. 2 and 4. A horizontal brace 167 is welded at one end to the bearing plate 165 and at the other end to the angle iron 19, as shown in Fig. 2. It should be noted that the unitary frame structure formed by the members 19, 21, 22, bracket 164 and brace 167 partly underlies the body of the tractor, and that the bracket 164 and brace 167 constitute an outrigger portion of said unitary frame structure which extends laterally from the tractor body in front of the rear wheel 11 of the tractor. A truss rod hanger 169 (Fig. 4) is fastened at one end to the bearing plate 165 and is suspended at the other end on a bracket 170 bolted to the side channel 5 of the tractor. The bracket 170 has a slotted opening 171 for ready engagement with the truss rod 169, and nuts 173 on the truss rod hold the truss rod in place on the bracket 170. A quadrant 175 is secured to the vertical flange of angle iron 19 by means of bolts 177 rearwardly of the lift shaft 163, the quadrant having a brace 179. Fulcrumed on the brace 179 at 181 is a bell crank lever having a rearwardly extending arm 183 and an upwardly extending arm 185, the arms being braced by a strap 187. The arm 183 extends rearwardly under and beyond the rear axle housing 1 of the tractor, and the rear end of the arm 183 has a socket 189 for the reception of a foot pedal 191, the foot pedal being adjustably retained in the socket by means of a set screw 193. The arm 185 has a handle 195 at its upper end and a latch 197 adapted to cooperate with a notch in the quadrant 175 is pivoted on a lower portion of the arm 185. A tension spring 199 hooked on the brace 187 urges the latch into engagement with the quadrant 175 and a latch handle 201 under the handle 195 is operatively connected with the latch 197 by pull rods 203 and 205 connected with a plate 207 pivoted on the arm 185, the latch handle being operable to release the latch after engagement thereof with the notch in the quadrant 175. The lift shaft 163 has an arm 209 which is operatively connected with the arm 185 by a curved link 211 to transmit rocking movement of the arms 183 and 185 to the lift shaft 163. The link 211 is curved to clear a belt pulley (not shown) on the tractor, the belt pulley being optional equipment and if installed may stay on the tractor without interference with the mowing attachment. 213 indicates a balancing spring which is anchored at one end on the angle iron 19 by means of an adjustable eye bolt 215, the eye bolt extending through an anchor plate 217 welded to the angle iron 19. The other end of the balancing spring 213 is connected with an arm 219 on the lift shaft 163 by means of a shackle 221 adapted to extend over the lift shaft 163. It will be seen that the foot pedal 191 is within foot reach of an operator on seat 18 and that the handle 195 of arm 185 is within hand reach of such operator. In order to lift the cutter bar assembly the operator steps on the pedal and if necessary also pulls with one hand on the handle 195 until the latch 197 locks in the notch of quadrant 175. The cutter bar assembly will then stay in an elevated position at a substantial distance from the ground. For transport purposes the cutter bar may be swung about the axis of pins 83 and 89 into a vertical position and held in such position by suitable connections with the tractor, such connections having not been shown in order to simplify the drawings. If the operator wishes to lower the cutter bar assembly, he steps on the foot pedal 191 in order to relieve the latch 197 from the load thereon and then releases the latch by manipulation of the latch handle 201 whereupon the cutter bar assembly will gravitate to the ground. When raising the cutter bar assembly the operator has both hands, or at least one hand, free to steer the tractor, and when lowering the cutter bar assembly he may retain hold of the steering wheel 16 of the tractor with his left hand.

The knife bar 121 of the cutting mechanism has a ball and socket connection, as stated, with one end of a pitman 127. Referring to Figs. 1, 6 and 9, a portion of the pitman adjacent to the end thereof which is connected with the knife bar 121 is housed within the yoke 51, the latter extending transversely over the pitman and downwardly at the forward side thereof. The other end of the pitman 127 is drivingly connected with a rotary shaft 223 (Fig. 5) which is mounted in the left bearing portion 47″ of bearing housing 47 by means of a roller bearing 225 and a ball bearing 227 (Fig. 5). Mounted on the forward end of shaft 223, in front of bearing housing 47, is a flywheel 229 which carries a crank pin 231, and a sleeve 233 is journaled on the crank pin and retained thereon against axial displacement by a washer and nut 235. The sleeve 233 has diametrically opposed trunnions 237 which are so arranged with respect to the crank pin 231 that the common axis of the trunnions and the axis of the crank pin are coplanar, the axis of the trunnions extending at right angles to the axis of the crank pin. The trunnions have pivotal connection with a pair of straps 239 secured to the upper and lower sides of the pitman.

Power for driving the shaft 223 is derived from the tractor by means of a power take-off mechanism at the under side of the tractor, shown in Fig. 12. Referring to Figs. 2, 3 and 12, mounted on the body of the tractor and forming a rearward casing portion thereof is a gear housing 241 which is bolted to the under side of the transmission housing of the tractor, part of such transmission housing being shown in Fig. 12 in light full lines and indicated by 243. Journaled in the gear housing 241 on roller bearings 245 is a power take-off shaft 247 which projects forwardly from the gear housing through a stuffing box 249. A spur gear 251 is keyed on the shaft 247 for axial sliding movement thereon, and a shifting fork 253 cooperating with a collar on gear 251 is rockably mounted in the housing. A throw-out lever 255 outside of the housing 241 is operatively connected with the shifting fork 253. Formed integrally with the housing 241 and projecting upwardly into the transmission housing 243 are bearing lugs 257 carrying a pin 259 on which an idler gear 261 is rotatably mounted in axially fixed position. The gear 261 is in constant mesh with a continuously rotating gear 263 of the tractor transmission, and in the position of gear 251 shown in Fig. 12 rotation of the gear 263 is transmitted to the power take-off shaft 247 through the idler gear 261 and gear 251. Movement of the throw-out lever 255 from its "on" position shown in full lines in Fig. 12 into its "off" position shown in dash-dotted lines will cause disengagement of the gear 251 from the idler 261, and transmission of power to the power take-off shaft will be interrupted. Similarly, movement of the throw-out lever 255 from its "off" into its "on" position will establish transmission of power to the power take-off shaft.

The axis of power take-off shaft 247 extends on a higher level than the axis of flywheel shaft 223, and rotary movement of the shaft 247 is transmitted to the flywheel shaft 223 by a telescopic driving connection including a slip clutch, as shown in Fig. 5. Mounted on the forwardly projecting end of the power take-off shaft 247 is a forked coupling member 265 cooperating with another forked coupling member 267 to form a universal joint, the coupling member 265 being retained on the power take-off shaft by a set screw 266 in the hub of the coupling member 265. Secured to the coupling member 267 is a square shaft 269 and a sleeve 271 has an internal square portion at one end telescopically engaging the square shaft 269. At the other end the sleeve 271 has a cylindrical bore, and a cylindrical shaft 273 telescopically engages the cylindrical bore of the sleeve 271. Mounted on the shaft 273 is a head 275 having tapered jaws cooperating with tapered jaws 277 at the adjacent end of the sleeve 271. Secured to the head 275 by bolt 279 are two arms 281, and mounted on the arms is a yoke 283 having a collar 285 with a cylindrical bore therein, the square shaft 269 extending through and being rotatable in the collar 285. A compression spring 287 surrounding the sleeve 271 is seated at one end on the yoke 283 and bears at its other end upon a collar of sleeve 271 to urge the jaws 277 of the sleeve into engagement with the jaws on the head 275. The yoke 283 is adjustable longitudinally of the arms 281 by means of nuts 289 to adjust the compression of the coil spring 287. The shaft 273 extends through the head 275, and a coupling member 291 is mounted on the projecting end of the shaft, the coupling member 291 cooperating with a coupling member 293 to form a universal joint. The coupling member 293 is secured to the shaft 223. In normal operation the jaws 277 of the sleeve 271 are held in engagement with the jaws on the head 275 by the expanding force of the spring 287, and rotation of the power take-off shaft 247 will be transmitted to the shaft 223, causing rotation of the flywheel 229 and reciprocating movement of the knife bar 121 through the pitman 127. However should a wire or other solid object become lodged between one of the knife sections 123 and an adjacent finger 119 of the cutter bar, the jaws 277 of the sleeve 271, due to their tapered engagement with the jaws of the head 275, will be forced out of engagement with the head against the expanding force of spring 287, and breakage of the pitman or other damage will be avoided. Likewise, breakage of the pitman or other damage will be prevented if power should accidentally be applied to the power take-off shaft while the cutter bar is in its vertical transport position. If it is desired to disconnect the mowing attachment from the tractor, the coupling member 265 may be withdrawn from the power take-off shaft 247 prior to the detachment of the frame 19, 21, 22 from the tractor, the telescopic engagement of the square shaft 269 with the sleeve 271 permitting sufficient forward movement of the assembled coupling members 265 and 267 to withdraw the coupling member 265 from the power take-off shaft after loosening of the set screw 266 in the hub of the coupling member 265. When mounting the attachment on the tractor, the frame 19, 21, 22 may first be secured in place on the tractor, and thereafter the coupling member 265 may be secured to the power take-off shaft, the telescopic connection between the shaft 269 and sleeve 271 permitting the necessary elongation.

It will be noted that the mower structure mounted on the tractor comprises a unitary frame 19, 21, 22 which is detachably carried by the tractor body and has a portion, namely, the cross member 22, underlying the body between the front and rear wheels, and that the cutting mechanism which includes the cutter bar 117 is pivotally connected to the drag arm 49 and is carried by the frame independently of the body. The lift mechanism for the cutting mechanism is carried on the frame member 19 which extends rearwardly from the underlying frame portion 22 in proximity to the operator's station 18, and it includes a control member, namely, the lever 183, 185, in the vicinity of the operator's station. The drive for the cutting mechanism includes a drive shaft, namely, the flywheel shaft 223, which is carried on the tractor substantially coaxially with the mower support axis, that is, with the axis of the bearing portion 47', and the drive shaft has a crank element 231 operatively connected with the cutting mechanism. The intermediate shaft 269 and the sleeve 271 of the telescopic driving connection between the power take-off shaft 247 and the drive shaft 223 constitute a longitudinally extending rotary drive member which is carried at its rear end on the tractor body and at its front end on the mower structure.

The working position of the cutter bar is shown in Fig. 1. Although the driver has a good view of the cutter bar from his seat 18, it may happen that the cutter bar strikes an obstruction hidden in the grass, such as a tree stump or a large stone, and in that event the cutter bar will break back into a non-working position by horizontal swinging movement about the axis of the pivot lug 71 on the cutter bar yoke, shown in Fig. 6. The backward strain to which the cutter bar is subjected when it encounters an obstruction causes pull on the strap 91, and the spring trip mechanism 101, 107 will yield to permit sliding movement of the strap and rearward swinging movement of the cutter bar into the position shown in Fig. 9, which is the position referred to as a non-working position. The expanding force of the coil spring 107 is so adjusted as to prevent rearward swinging of the cutter bar under normal working conditions, but under excessive rearward strain on the cutter bar, as stated, the V-shaped projections 115 on the head of bolt 101 will be forced out of engagement with the V-shaped notch 113 at the underside of strap 91, and thereafter the strap will meet only a slight resistance against sliding movement under the pull of the shoe 75. The rearward swinging movement of the cutter bar may continue until the end of the slot 99 in the strap 91 engages the bolt 101 as shown in Fig. 9, and further rearward movement of the cutter bar is stopped before the cutter bar can strike the rear wheel 11 of the tractor. When returning the cutter bar from its non-working position shown in Fig. 9 into its working position shown in Fig. 1, which may be done by hand, the strap 91 slides back on the yoke 51, and when the notch 113 on the strap registers with the projections 115 of the bolt 101 the bolt snaps back into locking engagement with the strap and the cutter bar is thereby retained in its working position. The strap 91 has very little vertical play on the yoke due to the large contact area of its upper and lower surfaces with the yoke, and in the position of the parts shown in Fig. 8, the strap is not only releasably locked against sliding movement but it also stabilizes the shoe 75 against up and down movement at its forward end relative to the yoke. Upward tilting forces acting upon the shoe at its forward end are transmitted to the yoke through the strap 91, and the rearward pivotal connection between the shoe and the yoke is thereby relieved from twisting strains which would result if upward tilting forces were not taken up at a forward portion of the shoe, as by the strap 91. The strap 91 continues to stabilize the shoe 75 relative to the yoke 51 throughout the pivotal movement of the shoe about the pivot lug 71 when the cutter bar moves from its working position into its non-working position, and vice versa, and it will be noted that long upper and lower surface portions of the strap are fully engaged by upper and lower guide surfaces on the yoke after the cutter bar has moved into its non-working position as shown in Fig. 9. As mentioned hereinbefore, the forward extension of the web 58 is laterally inclined towards the cutter bar side of the yoke, and the strap 91 is slidably fitted between the lower surface of said extension and the upper surface of the bottom wall 62 which underlies said extension and is laterally inclined parallel therewith. In other words, the line of sliding movement of the strap 91 on the yoke 51 extends in a generally horizontal direction but is somewhat inclined relative to a plane at right angles to the axis of the pivot lug 71, as shown in Figs. 7 and 8, and the forward end of the shoe will therefore be guided on a spiral downward path during backward movement of the cutter bar, the rear hanger 73 being fitted upon the pivot lug 71 with sufficient play to avoid binding due to the downward displacement at the forward end of the shoe.

As will be seen from Fig. 9, the pitman 127 remains engaged with the knife bar 121 throughout the backward swinging movement of the cutter bar, and it is necessary to interrupt the transmission of power to the pitman 127 very shortly after the cutter bar has started its backward movement, because the friction of the knife bar 121 on the cutter bar 117 rapidly increases as its line of movement is thrown out of alinement with the pitman, and at a certain angular displacement of the cutter bar the pitman could no longer reciprocate the knife bar at all. The necessary interruption of the driving power is accomplished by automatically moving the throw-out lever 255 of the power take-off mechanism from its "on" into its "off" position very shortly after the cutter bar has started to move from its working into its non-working position. Referring to Figs. 2 and 10, a strap iron 295 bent into V-shape extends horizontally below the tractor in the vicinity of the power take-off housing 241, the strap iron being secured at its ends to the frame angle iron 21, preferably by welding. A bell crank lever having a long arm 297 and a short arm 299 is pivotally mounted on a bolt 301 extending through the strap iron 295. Pivotally connected with the short arm 299 of the bell crank lever at 303 is a clevis 305, and an eye bolt 307 is threaded into the clevis for longitudinal adjustment thereon, the eye bolt being pivotally connected with the throw-out lever 255 at 309. A vertically movable rod 311 extends through a plate 313 mounted on the tractor and is pivotally connected at its lower end with the long arm 297 of the bell crank lever. The rod 311 has a handle portion at its upper end within reach of the driver's seat 18 and it will be seen that by pulling the rod up the throw-out lever may be moved by hand from its "off" position into its "on" position, and by pushing the rod 311 down the throw-out lever may be moved from its "on" position into its "off" position. In Fig. 10 the throw-out lever 255 is shown in its "off" position, and its "on" position is indicated by a dash-dotted line. Also pivotally mounted on the bolt 301 and swingable independently of the bell crank lever 297, 299 is an actuating lever or arm 315 which has a laterally projecting stud 331 secured thereto at its upper end, and the lower end of which is provided with a recess extending towards the bolt 301 and forming an open slot. A tension spring 317 is anchored at one end on the portion of the arm 315 which extends downwardly from the bolt 301, and the other end of the spring 317 is anchored on a bracket 319 by means of an adjustable bolt 321, the bracket 319 being secured in fixed position on the strap iron 295. A support 323 for a bell crank lever 325 is secured to the strap iron 295 rearwardly of the bolt 301, the bell crank lever 325 being pivoted on the support 323 at 327 and having a stud 329 on its forwardly extending arm adapted to enter the open slot at the lower end of the arm 315.

The position in which the arm 315 is shown in Fig. 10 may be termed "a first position" of said arm, and in the position of the parts shown in Fig. 10, swinging movement of the arm 315 from said first position about the bolt 301 is prevented by engagement of the stud 329 with the slot at the lower end of the arm, and the spring 317 exerts substantial pull on the arm 315. Assuming now that the rod 311 is pulled upwardly to move the throw-out lever 255 from its "off" into its "on" position, it will be seen that the short arm 299 is moved towards the upper end of the arm 315 and the length of the connection between arm 299 and lever 255 is so adjusted that the lever 255 arrives in its "on" position shortly before the arm 299 engages the laterally projecting stud 331 on the upper end of lever 315. Automatic movement of the throw-out lever 255 from its "on" into its "off" position may then be effected by swinging the bell crank lever 325 in clockwise direction with reference to Fig. 10, causing the stud 329 to move out of the slot at the lower end of arm 315. As soon as the stud 329 releases the arm 315 the arm 315 swings about the bolt 301 under the tension of spring 317 and by engagement of the stud 331 with the arm 299 the throw-out lever 255 is moved from its "on" into its "off" position. The throw-out movement under the action of spring 317 is arrested by a stud 333 projecting from the support 323, the bell crank lever 325 being arranged at one side of the support 323 and the stud 333 at the other. At the end of the throw-out movement the arm 297 strikes the stud 333 so that the fork 253 (Fig. 12) of the power take-off mechanism will not be subjected to a harmful shock. The position which the arm 315 occupies at the end of the throw-out movement, that is, when the arm 297 bears upon the stud 333 and the stud 331 bears upon the arm 299, may be termed "a second position" of the arm 315. In order to reset the arm 315 from said second position into its first position in which it is shown in Fig. 10, the long arm 297 may be pushed up by hand so as to move the arm 315 into its first position and permit reengagement of the stud 329 with the slot at the lower end of arm 315.

The bolt 301 and stud 331 afford a lost motion connection between the arms 299 and 315, which permits movement of the throw-out lever 255 from its "on" into its "off" position, and vice versa, while the arm 315 remains in its first position in which it is shown in Fig. 10. The lost motion connection enables the operator to restore the arm 315 from its second to its first position and the throw-out lever 255 from its "off" to its "on" position in one operation, and if after such restoration the operator desires to move the throw-out lever from its "on" into its "off" position without disturbing the setting of the arm 315, he may accomplish this by pushing the rod 311 down.

The bell crank lever 325 is connected by suitable linkage with the rear hanger 73 of the cutter bar shoe 75 so as to cause release of the arm 315 shortly after the cutter bar has started to move from its working into its non-working position. Pivoted on the upper arm of bell crank lever 325 is a clip 335 (Fig. 2) on which an eye bolt 337 is adjustably mounted by means of a nut 339. A bent link 341 is hooked at one end into the eye bolt 337 and at the other end into an arm 343 pivoted on a bracket 345 which is bolted to the vertical flange of the frame angle iron 21. The rear hanger 73 has an arm 347 as shown in Figs. 9 and 11, and a link 349 is hooked at one end into the arm 343 and at the other end into the arm 347 of the rear hanger 73. When the cutter bar moves from its working into its non-working position, the rear hanger 73 turns on the pivot lug 71, and such turning movement of the rear hanger will be transmitted through the link 349 to the arm 343, and from the arm 343 through the link 341, eye bolt 337, nut 339 and clip 335 to the bell crank lever 325, causing the bell crank lever to move in clockwise direction with reference to Fig. 10, and to trip the arm 315. It will be seen that slack in the entire linkage may be taken up by turning the nut 339, and the arm 315 may therefore be tripped very shortly after the cutter bar has started to move from its working into its non-working position. As a result, the power take-off shaft 247 will be disconnected from the permanently rotating idler gear 261 long before the angular displacement of the knife bar 121 relative to the pitman 127 has reached the danger point where the pitman could no longer reciprocate the knife bar.

It is desirable that in the working position of the cutter bar the pitman extends accurately at right angles to the axis of the flywheel shaft 223, and in actual operation, that is, when the machine advances and grass is being cut, the knife bar should reciprocate as nearly as possible in line with the pitman. The normal resistance encountered by the cutter bar when grass is being cut tends to bend the cutter bar back, and the cutter and knife bars will be elastically deformed more or less, depending on the rigidity and length of the cutter bar. In a standard type of cutter bar, for instance, having a length of seven feet, the elastic horizontal deformation amounts to about 1¼ inches at the outer end of the cutter bar. In order to compensate this elastic deformation and insure alinement of the deformed knife bar with the pitman, the cutter bar is given a certain lead, that is, when the mower is at rest the cutter bar extends at a slight angle forwardly relative to a vertical plane through the center line of the pitman. The resistance encountered by the cutter bar during actual cutting will then bend the cutter and knife bars back into alinement with the pitman. Adjustment of the yoke 51 so as to position the pitman accurately at right angles to the axis of the flywheel shaft 223 may be made by means of the nuts 67 and 69 on the brace rod 63, and the lead of the cutter bar may be adjusted by means of the bolt 93 and serrated washers 97 on the front hanger 87 (Fig. 8). If it is desired to increase the lead of the cutter bar the bolt 93 is moved into a position closer to the pin 89 and similarly, if it is desired to decrease the lead of the cutter bar the bolt 93 is moved into a position farther away from the pin 89. As the pivotal connections between the shoe 75 and the yoke 51 become worn the lead of the cutter bar decreases, but such loss of lead may easily be corrected by adjustment of the bolt 93.

From the foregoing description of the cutter bar assembly and its connection with the tractor it will be seen that the cutter bar 117 and knife bar 121 constitute a moving arm and that the support for this mowing arm includes a housing, it having been pointed out hereinbefore that a portion of the pitman 127 is housed within the cutter bar yoke 51. The mowing arm has a shoe, namely, the shoe 75, which has a universal joint connection with the housing, that is, with the yoke 51, by means of the rear hanger 73. An elongated member, namely, the strap 91, is pivotally connected to the shoe by the front hanger 87 in spaced relation to the universal joint, whereby the mowing arm 117, 121 and shoe 75 as a unit may swing vertically about the universal joint and pivotal connection. The elongated member or strap 91 is slidable longitudinally relative to the housing, that is, relative to the yoke 51, so that the strap 91, front hanger 87, shoe 75 and mowing arm as a unit may swing horizontally about the universal joint. Finally, the locking device comprising the bolt 101 and spring 107 normally holds the strap 91, front hanger 87, shoe 75 and mowing arm 117, 121 from horizontal movement about the universal joint, but the locking device is yieldable when the mowing arm encounters an obstruction, to permit such horizontal movement.

It will further be noted that the forward connection between the shoe 75 and the yoke 51 includes two pivotally connected members, namely, the strap 91 and the bolt 93, one of which members, namely, the bolt 93, is adjustably connected to the shoe by means of the serrated washers 97, and the other of which members, namely, the strap 91, slidably engages the housing or yoke 51.

In connection with the description of the frame 19, 21, 22 it has been stated hereinbefore that in order to detach the frame from the tractor the nuts on the bolts 29, 37 and 45 are loosened and the frame is pulled forwardly so that the hangers 33 and 39 will first drop from the tractor and by continued pull the rear end of frame angle 19 will be dropped from the bracket 27. Before the frame can be disconnected from the tractor in the mentioned manner the truss rod hanger 169 will have to be disconnected from the bracket 170 by loosening the nuts 173 and swinging the rod 169 forwardly out of engagement with the slotted opening 171. Moreover, the coupling member 265 on the power take-off shaft 247 will have to be disconnected from the power take-off shaft as described hereinbefore, and the rod 311 (Fig. 10) will have to be unhooked from the arm 297, and the eye bolt 307 detached from the throw-out lever 255, before the frame can be dropped from the tractor. The various mechanisms mounted on the frame, such as the pitman drive mechanism, the cutter bar support, the entire lift mechanism and the automatic throw-out mechanism may stay on the frame when the frame is dropped from the tractor. After the mentioned disconnections have been made and the frame has been dropped, the entire attachment rests on the ground with the frame underlying the body of the tractor. The tractor is then free to be driven away from the attachment by making a rearward left hand turn as indicated in dash-dotted lines in Fig. 1. The operator will turn the front wheels 13, 15 of the tractor to the right as far as they will go, throw the transmission in reverse, and make a sharp rearward turn to the left. During such turn, the front wheels will travel on a arcuate path indicated by the dash-dotted circle 14 in Fig. 1 without interference with the frame, the frame being suitably tapered forwardly at the left, as shown, to afford clearance for the front wheels during their rearward travel on circle 14. As also shown in Fig. 1, the rear wheel 11 of the tractor will travel during the mentioned rearward turn on an arcuate path indicated by the circle 12, without interference with the frame angle 19 or the arm 183 and foot pedal 191. The rearward turn of the tractor may be continued until the tractor arrives in the position shown at the bottom of Fig. 1, where the operator may then shift into a forward gear and drive away, leaving the mowing attachment where it has been dropped. In connecting the tractor with the attachment, the described procedure will be followed in reverse order. That is, the tractor will be driven behind the attachment into a position substantially parallel with the cutter bar 117, as shown in dash-dotted lines at the bottom of Fig. 1, and from this dash-dotted position it will be driven into the full line position in which its body overlies the attachment frame, by making a turn to the right. After the tractor has arrived in the full line position, the rear end of the frame angle 19 is lifted upon the bracket 27, preferably by lifting up on the foot pedal 191, and thereafter the front end of the frame is lifted and the frame pushed back in order to secure the hangers 33 and 39 to the tractor as described hereinbefore. The truss rod 169 may then be secured to the bracket 170, the coupling member 265 connected with the power take-off shaft 247, and the throw-out lever 255 connected with the eye bolt 307. The rod 311 and plate 313 which may have been removed from the tractor are installed and the rod 311 is hooked up with the arm 297, whereupon the tractor and attachment are ready for mowing. In manipulating the tractor away from the attachment, or over the attachment, braking of the wheel 11 or possibly locking of this wheel may become desirable. Individual brakes for the rear wheels are standard equipment on farm tractors and if necessary, the operator may use the brake for the wheel 11 conveniently to manipulate the tractor from or over the attachment frame.

It should be understood that it is not intended to limit the invention to the exact details of construction herein shown and described, for various modifications may be made without departing from the scope of the appended claims.

It is claimed and desired to secure by Letters Patent:

1. In combination, a tractor having a wheeled front support, a rear axle structure and rear wheels mounted thereon, an attachment frame having a forward portion behind said front support and a rearward portion underlying said rear axle structure, and detachable connecting means between said frame and tractor, said forward portion of said frame being tapered transversely of said tractor to permit unobstructed arcuate travel of said front support while the tractor is being driven out of and into an attaching position over said frame.

2. In combination, a tractor having a wheeled front support, a rear axle structure and a pair of rear wheels mounted thereon, an attachment frame having a forward portion behind said front support at one side of a vertical plane extending longitudinally of the tractor centrally through said front support, and a rearward portion underlying said rear axle structure adjacent to one of said rear wheels at the other side of said plane, and detachable connecting means between said frame and tractor, said forward portion of said frame being tapered forwardly transversely of said plane to permit unobstructed arcuate travel of said front support while the tractor is being driven out of and into an attaching position over said frame.

3. In combination, a tractor having a wheeled front support, a rear axle structure and a pair of rear wheels mounted thereon, an attachment frame having a rearward portion underlying said rear axle structure and a forward portion behind said front support at one side of a vertical plane extending longitudinally of the tractor centrally through said front support, implement supporting means at the other side of said plane, connected with said frame and extending laterally therefrom in advance of and beyond one of said rear wheels, and detachable connecting means between said frame and tractor, said forward portion of said frame being tapered forwardly transversely of said plane to permit unobstructed arcuate travel of said front support while the tractor is being driven out of and into an attaching position over said frame.

4. In combination, a tractor having a wheeled front support, a rear axle structure and a pair of rear wheels mounted thereon, an attachment frame having a rearward portion underlying said rear axle structure and a forward portion behind said front support at one side of a vertical plane extending longitudinally of the tractor centrally through said front support, detachable connecting means between said frame and tractor, and mowing mechanism on said frame, including an arm at the other side of said plane, and a cutter bar yoke mounted on said arm in advance of one of said rear wheels, said forward portion of said frame being tapered forwardly transversely of said plane to permit unobstructed arcuate travel of said front support while the tractor is being driven out of and into an attaching position over said frame.

5. In combination, a tractor having a wheeled front support, a rear axle structure and a pair of rear wheels mounted thereon, an attachment frame having a rearward portion underlying said rear axle structure and a forward portion behind said front support at one side of a vertical plane extending longitudinally of the tractor centrally through said front support, detachable connecting means between said frame and tractor, and mowing mechanism on said frame, including an arm at the other side of said plane, and a cutter bar yoke mounted on said arm in advance of one of said rear wheels, said forward portion of said frame being tapered forwardly transversely of said plane and having a bracing connection with said cutter bar yoke.

6. In combination, a tractor having a body, a pair of rear wheels and a wheeled front support for said body, an attachment frame having a rear portion secured to a lower portion of said body between said rear wheels, said attachment frame also having a forward portion below said body in advance of said rear wheels and an outrigger portion intermediate said rear and forward portions, extending in front of one of said rear wheels, mowing mechanism mounted on said frame including a cutter bar yoke in advance of said rear wheel, a supporting arm for said yoke connected with said forward portion of said frame for swinging movement in a vertical plane, and lifting mechanism for said arm mounted on said outrigger portion of said frame.

7. In combination with a tractor having front and rear wheels, a frame extending longitudinally below said tractor and detachably secured thereto, mowing mechanism mounted on said frame including a vertically movable cutter bar extending transversely of said tractor in advance of the rear wheels thereof, and raising and lowering means for said cutter bar comprising a lift shaft rotatably mounted on said frame and extending transversely of said tractor forwardly of one of said rear wheels, a lifting lever mounted on said frame for pivotal movement about an axis radially spaced from the axis of said lift shaft, and a pair of transversely spaced arms on said lift shaft operatively connected, respectively, with said cutter bar and with said lifting lever.

8. In a mower, a cutter bar yoke, a cutter bar connected with said yoke for movement from a horizontal working position transversely of said yoke into a horizontal rearwardly inclined non-working position, a stabilizing connection between said cutter bar and yoke including a strap element slidably mounted on said yoke, a stop on said yoke engageable by said strap element to prevent said cutter bar from moving beyond said non-working position, and locking means cooperating with said strap element to releasably retain said cutter bar in said working position thereof.

9. In a mower, a cutter bar yoke, a cutter bar connected with said yoke for movement from a horizontal working position transversely of said yoke into a horizontal rearwardly inclined non-working position, a stabilizing connection between said cutter bar and yoke including a slotted strap element slidably mounted on said yoke, a pin element on said yoke extending through said slotted strap element and having a lateral projection adapted to enter a notch in said strap element, and spring means acting longitudinally of said pin element to urge said lateral projection thereof into engagement with said notch.

10. In a mower, a cutter bar having a shoe at one end, a support, a connecting element secured to said support for pivotal movement relative thereto about a vertical axis and having pivotal connection with said shoe about a horizontal axis extending longitudinally of said shoe, a second connecting element mounted on a portion of said shoe remote from said vertical axis for pivotal movement about said horizontal axis, a strap element guided on a portion of said support remote from said vertical axis for sliding movement relative to said support in a generally horizontal direction, a vertical pivot connection between said strap element and said second connecting element adjustable transversely of said shoe, and spring pressed locking means cooperating with said support and said strap element for releasably locking said strap element against said sliding movement thereof relative to said support.

11. In a mower, a cutter bar having a shoe at one end, a support, a connecting element secured to said support for pivotal movement relative thereto about a vertical axis and having pivotal connection with said shoe about a horizontal axis extending longitudinally of said shoe, a second connecting element mounted on a portion of said shoe remote from said vertical axis for pivotal movement about said horizontal axis, a strap element guided on a portion of said support remote from said vertical axis for sliding movement relative to said support in a generally horizontal direction and connected with said second connecting element for pivotal movement relative thereto about a vertical axis, and spring pressed locking means cooperating with said support and said strap element for releasably locking said strap element against said sliding movement thereof relative to said support.

12. In combination, a tractor having a body, a pair of rear wheels and a wheeled front support for said body, a unitary attachment frame having a portion underlying said tractor body and an outrigger portion rigidly connected with said underlying frame portion and extending laterally of said body in front of one of said rear wheels, means detachably connecting said frame and body to retain said frame in transversely fixed position relative to said tractor, mowing mechanism mounted on said frame including a cutter bar yoke in advance of said rear wheel, a supporting arm for said yoke pivoted on said underlying frame portion for vertical swinging movement in advance of said outrigger portion, a transverse lift shaft rockably mounted on said outrigger portion and having an arm at its outer end swingable in a vertical plane adjacent to said yoke, and operatively connected therewith, and means operatively connected with said lift shaft for rocking the same and locking it against rotation.

13. In combination, a tractor having a body, a pair of rear wheels and a wheeled front support for said body, a unitary attachment frame having a front portion underlying said tractor body and an outrigger portion rearwardly of and rigidly connected with said front portion and extending laterally of said body in front of one of said rear wheels, means detachably connecting said frame and and body to retain said frame in transversely fixed position relative to said tractor, mowing mechanism mounted on said frame including a cutter bar yoke in advance of said rear wheel, a supporting arm for said yoke connected with said forward portion of said frame for swinging movement in a vertical plane, a transverse lift shaft rockably mounted on said outrigger portion and operatively connected with said cutter bar yoke for raising and lowering the latter, and means on said frame for rocking said lift shaft and locking it against rotation to hold said yoke in raised position.

14. In combination, a tractor having a wheeled front support, a rear axle structure and a pair of rear wheels mounted thereon, a unitary attachment frame having a rearward portion underlying said rear axle structure and a forward portion underlying a forward portion of said tractor rearwardly of said front support, detachable connecting means between said frame and tractor, drag means connected with said frame at longitudinally spaced points thereof and extending laterally therefrom, cutting mechanism secured to the outer end of said drag means and retained by the latter in a predetermined position transversely of said frame, and driving means for said cutting mechanism including a shaft mounted on said frame for rotation about an axis extending longitudinally of said tractor, said frame, drag means and driving means being arranged in such relation to each other as to form an assembled unit affording unobstructed arcuate travel of said front support along the side of said unit remote from said cutting mechanism while said tractor is being driven out of and into an attaching position over said frame.

15. In a mower, a frame, a cutter bar mounted on said frame for movement relative thereto from a working into a non-working position, a knife bar reciprocably mounted on said cutter bar, drive mechanism for said knife bar including relatively engageable and disengageable power transmitting elements, a member movably mounted on said frame, means connected with one of said power transmitting elements and adapted to cooperate with said movable member for disengaging said power transmitting elements from each other by movement of said movable member from a first into a second position, spring means connected with said movable member and acting to urge said movable member from its first into its second position, a stop element movable into the path of said movable member to hold said movable member in said first position against the action of said spring means, and means operatively connecting said stop element with said cutter bar to withdraw said stop element from the path of said movable member by movement of said cutter bar from its working towards its non-working position.

16. In a mower, a frame, a cutter bar mounted on said frame for movement relative thereto from a working into a non-working position, a knife bar reciprocably mounted on said cutter bar, drive mechanism for said knife bar including relatively engageable and disengageable power transmitting elements, manually operable means for moving one of said power transmitting elements into and out of engagement with the other of said power transmitting elements, a member mounted on said frame for movement from a first into a second position, lost motion connecting means between said movable member and said manually operable means whereby said one power transmitting element may be moved manually from engagement with into disengagement from said other power transmitting element, and vice versa, while said movable member occupies its first position and whereby said one power transmitting element may be moved from engagement with into disengagement from said other power transmitting element by movement of said movable member from its first into its second position, spring means connected with said movable member and acting to urge said movable member from its first into its second position, a stop element movable into the path of said movable member to hold said movable member in its first position against the action of said spring means, and means operatively connecting said stop element with said cutter bar to withdraw said stop element from the path of said movable member by movement of said cutter bar from its working towards its non-working position.

17. In a mower, a frame, a cutter bar mounted on said frame for pivotal movement about a substantially vertical axis, locking means releasably securing said cutter bar to said frame in normal position transversely of the direction of propulsion of the mower and acting to release said cutter bar to permit rearward movement thereof when subjected to excessive pressure due to the cutter bar encountering an obstruction, a knife bar reciprocably mounted on said cutter bar, drive mechanism for said knife bar including relatively engageable and disengageable power transmitting elements, a member movably mounted on said frame, means connected with one of said power transmitting elements and adapted to cooperate with said movable member for disengaging said power transmitting elements from each other by movement of said movable member from a first into a second position, spring means connected with said movable member and acting to urge said movable member from its first into its second position, a stop element movable into the path of said movable member to hold said movable member in said first position against the action of said spring means, and means operatively connecting said stop element with said cutter bar to withdraw said stop element from the path of said movable member by said rearward movement of said cutter bar upon release of said locking means.

18. In combination with a tractor having a power take-off shaft and a lever movable on the tractor between "on" and "off" positions to connect and disconnect said power take-off shaft with a driving element on the tractor; a mowing attachment comprising a frame detachably secured to said tractor, a cutter bar mounted on said frame for movement relative thereto from a working into a non-working position, a knife bar reciprocably mounted on said cutter bar and drivingly connected with said power take-off shaft, an arm pivoted on said frame, means connected with said lever and adapted to cooperate with said arm to move said lever from its "on" into its "off" position by pivotal movement of said arm from a first into a second position, spring means reacting between said frame and arm to urge said arm from said first into said second position, a locking element pivotally movable on said frame into the path of said arm to hold said arm in said first position against the action of said spring means, and link mechanism connected with said locking element and said cutter bar for moving said locking element out of the path of said arm by movement of said cutter bar from its working towards its non-working position.

19. In combination with a tractor having a power take-off shaft and a lever movable on the tractor between "on" and "off" positions to connect and disconnect said power take-off shaft with a driving element on the tractor; a mowing attachment comprising a frame detachably secured to said tractor, a cutter bar mounted on said frame for movement relative thereto from a working into a non-working position, a knife bar reciprocably mounted on said cutter bar and drivingly connected with said power take-off shaft, an arm and a lever pivoted on said frame for movement independently of each other and having relatively engageable portions for transmitting movement of said arm in one direction to said lever on said frame, spring means reacting between said arm and frame to yieldingly resist movement of said arm in said direction, a stop element on said frame movable into the path of said arm to hold said arm, after movement thereof against the action of said spring means, in a predetermined position, a link connecting said lever on said tractor with said lever on said frame, whereby said relatively engageable portions of said arm and lever on said frame may be moved into proximity of each other by movement of said lever on said tractor from its "off" into its "on" position while said arm is being held in said predetermined position, and means connected with said stop element and said cutter bar for moving said locking element out of the path of said arm by movement of said cutter bar from its working towards its non-working position.

20. In a mower, a cutter bar having a shoe at one end, a support, a universal connection between said support and one end of said shoe, affording vertical and horizontal swinging movement of said shoe relative to said support, a connecting element mounted on said shoe near the other end thereof for pivotal movement relative thereto about an axis extending longitudinally of said shoe and in such relation to said universal connection as to accommodate said vertical swinging movement of said shoe, a strap element guided on a portion of said support remote from said universal connection for sliding movement relative to said support in a generally horizontal direction, a vertical pivot connection between said strap element and said connecting element, and spring pressed locking means cooperating with said support and said strap element for releasably locking said strap element against said sliding movement thereof relative to said support.

21. In a mower, a wheel supported frame, a drag arm pivoted on said frame for swinging movement in a vertical plane transversely to the direction of propulsion of the mower, a cutter bar yoke mounted on the outer end of said drag arm, a cutter bar having a shoe universally connected at one end thereof with said yoke for vertical and horizontal swinging movement of said shoe relative to said cutter bar yoke, a coupling element mounted on said shoe near the other end thereof for pivotal movement relative to said shoe about an axis extending longitudinally of said shoe and in such relation to said universal connection as to accommodate said vertical swinging movement of said shoe, releasable locking means cooperating with said coupling element and with a portion of said yoke remote from said universal connection to releasably secure said cutter bar to said yoke in a normal position transversely to the direction of propulsion of the mower, an arm on said shoe, a lever pivotally mounted on said yoke, and a flexible connection between said arm and lever, whereby said cutter bar, in said normal position thereof may be swung about said horizontal axis by operation of said lever, and whereby said cutter bar upon release of said locking means may swing horizontally about said universal connection independently of operation of said lever.

22. In a mower, a wheel supported frame, a drag arm pivoted on said frame for swinging movement in a vertical plane transversely to the direction of propulsion of the mower, a cutter bar yoke mounted on said drag arm for pivotal movement relative thereto about an axis extending longitudinally of said plane, adjusting means connected with said arm and yoke for securing said yoke in a plurality of pivotally adjusted positions on said arm, a cutter bar having a shoe universally connected at one end thereof with said yoke for vertical and horizontal swinging movement of said shoe relative to said yoke, a coupling element mounted on said shoe near the other end thereof for pivotal movement relative to said shoe about a horizontal axis extending longitudinally of said shoe and in such relation to said universal connection as to accommodate said vertical swinging movement of said shoe, releasable locking means cooperating with said coupling element and with a portion of said yoke remote from said universal connection to releasably secure said cutter bar to said yoke in a normal position transversely of the direction of propulsion of the mower, an arm on said shoe, a lever pivotally mounted on said yoke, and a flexible connection between said arm and lever, whereby said cutter bar, in said normal position thereof and in any position of pivotal adjustment of said yoke, may be swung about said horizontal axis by operation of said lever, and whereby said cutter bar, in any position of pivotal adjustment of said yoke, may swing upon release of said locking means in a generally horizontal direction about said universal connection independently of operation of said lever.

23. In a mowing machine, a mowing arm having a shoe, a support for the arm including a housing, a universal joint connecting the shoe to the housing, an elongated member carried by the housing and pivotally connected to the shoe in spaced relation to the universal joint whereby the arm and shoe as a unit may swing vertically about the universal joint and pivotal connection, the elongated member being slidable longitudinally relative to the housing so that the elongated member, pivotal connection, shoe and arm as a unit may swing horizontally about the universal joint, means carried by the housing and engageable with the elongated member to hold the elongated member, pivotal connection, shoe and arm from horizontal movement but yieldable when the arm encounters an obstruction to permit such horizontal movement, and means carried by the elongated member and engageable with the housing to limit such horizontal movement.

24. In a mowing machine, a tractor, a housing carried by the tractor, a mowing arm, a universal joint connecting the arm to the housing, and a member slidably connected to the housing and pivotally connected to the arm, the pivotal connection cooperating with the universal joint to permit the arm to swing vertically relative to said housing and member, the sliding connection permitting limited horizontal movement of the member, pivotal connection and arm as a unit about the universal joint.

25. In a mower, a shoe support, a shoe, and laterally spaced pivotal connections between said shoe and support permitting vertical movement of the shoe relative to the support, one of said pivotal connections and shoe being slidably connected to the support so that the one pivotal connection mentioned and the shoe as a unit may move in a substantially horizontal direction relative to the other pivotal connection.

26. In a mowing machine, a tractor, a bracket supported from the tractor for vertical swinging movement relative thereto, a mower shoe beside the bracket, and laterally spaced connections between the shoe and bracket, one being a universal connection, and the other being a pivotal connection, the pivotal connection including a member slidable relative to the bracket in an arc substantially concentric with the universal connection.

27. In a mowing machine, a tractor, a housing supported from said tractor for vertical swinging movement relative thereto, said housing having laterally spaced portions, a mower shoe having a universal connection with one of said portions, a connection between the shoe and the other of said portions including two pivotally connected elements, one of said elements being adjustably connected to the shoe, the other of said elements slidably engaging the housing, and means carried by the housing for yieldably retaining the slidable element against sliding movement.

28. In a mowing machine, a tractor, a housing adjustably supported from the tractor, a mower shoe having a universal connection with the housing, a mower bar carried by the shoe, and means controlling movement of the shoe in one direction relative to the housing including two pivotally connected members, one being adjustably connected to the shoe, the other slidably engaging the housing, and a yieldable detent carried by the housing and engaging the slidable member.

29. In a mowing machine, a tractor, a housing supported from said tractor, and a mower shoe having laterally spaced connections with the housing, one being a universal connection, and the other being a combined pivotal and sliding connection, the pivotal connection including a part adjustable relative to the shoe.

30. For a tractor having a longitudinal body carried by front and rear wheels and having a power take-off shaft projecting from a rearward casing portion thereof, a mower structure comprising a unitary frame detachably carried by the body and having a portion underlying the body between the front and rear wheels, an arm pivotally connected to said underlying frame portion for vertical movement relative thereto, cutting mechanism connected with the arm and carried by the frame independently of the body, and driving means connected with the power take-off shaft outside of said casing portion and with the cutting mechanism and including a longitudinally extending rotary drive member carried at its rear end on the body and at its front end on the mower structure.

31. For a tractor having a longitudinal body carried on front and rear wheels and including an operator's station at its rear, a mower structure comprising a unitary frame detachably carried by the body including a portion underlying said body forwardly of the operator's station and a frame member extending from said underlying frame portion rearwardly in proximity to the operator's station, a mower carried by the frame at one side of and independently of the body and including a cutter-bar hinged for vertical movement, and lifting and lowering means for the cutter-bar carried by said rearwardly extending member of the frame independently of the body and including a control member in the vicinity of the operator's station.

32. For a tractor having a longitudinal body carried by front and rear wheels and having a power take-off shaft projecting from a rearward casing portion thereof, a mower structure comprising a unitary frame detachably carried by the body and having a portion underlying said body between the front and rear wheels, an arm connected with said underlying frame portion for vertical movement relative thereto about a longitudinal axis, cutting mechanism connected with the arm and carried by the frame independently of the body for vertical movement, and driving means connected with the power take-off shaft outside of said casing portion and with the cutting mechanism including a rotatable drive member carried by the frame on an axis substantially coaxial with the aforesaid axis.

33. In a tractor-mounted mower wherein the tractor includes a longitudinal body carried on front and rear wheels and having a power take-off shaft projecting from a rearward casing portion thereof, the combination with the body of a mower structure comprising a unitary frame detachably carried by the body, and having a portion underlying said body between the front and rear wheels, a mower carried by the frame independently of the body for vertical movement with respect to the body from ground position to raised position and extending laterally at one side of the tractor, said mower comprising an arm pivotally connected to said underlying frame portion and cutting mechanism pivotally connected to the arm, driving means for the cutting mechanism connected to the power take-off shaft outside of said casing portion and including a longitudinally extending rotary drive member carried at its rear end on the body and at its front end on the mower structure, and lifting and lowering means for the mower carried by the frame independently of the body.

34. In a tractor-mounted mower wherein the tractor includes a longitudinal body carried on front and rear wheels and having a power take-off shaft projecting from a rearward casing portion thereof, the combination with the body of a mower supported by the body between the front and rear wheels on a longitudinal axis for vertical movement from ground position to raised position and extending laterally at one side of the tractor, cutting mechanism for the mower, a rotatable drive shaft carried by the body on an axis substantially coaxial with the mower support axis and having a crank element operatively connected with the cutting mechanism, a longitudinally extending rotary drive member drivingly connected at its rear end with the power take-off shaft outside of said casing portion and at its front end with said drive shaft, and lifting and lowering means for the mower carried by the tractor body.

35. In a mower, a cutter bar yoke, a cutter bar, pivot means connecting said cutter bar with said yoke, a coupling member guided on a portion of said yoke remote from said pivot means for movement in a generally horizontal direction, means connecting said coupling member with a portion of said cutter bar remote from said pivot means, spring pressed locking means cooperating with said coupling member and yoke to releasably secure said cutter bar in a normal position on said yoke transversely to the direction of propulsion of the mower, said spring pressed locking means acting, when subjected to excessive pressure due to the cutter bar encountering an obstruction, to release said coupling member and permit rearward movement of said cutter bar about said pivot means, and means for preventing separation of said coupling member from said yoke due to said rearward movement of said cutter bar.

36. In a mower, a cutter bar yoke, a cutter bar, pivot means connecting said cutter bar with said yoke, a coupling member guided on a portion of said yoke remote from said pivot means for movement in a generally horizontal direction, means connecting said coupling member with a portion of said cutter bar remote from said pivot means, spring pressed locking means cooperating with said coupling member and yoke to releasably secure said cutter bar in a normal position on said yoke transversely to the direction of propulsion of the mower, said spring pressed locking means acting, when subjected to excessive pressure due to the cutter bar encountering an obstruction, to release said coupling member and permit rearward movement of said cutter bar about said pivot means, and a stop on said yoke engageable by said coupling member to limit said rearward movement of said cutter bar.

37. In a mower, a cutter bar yoke, a cutter bar, pivot means connecting said cutter bar with said yoke, coupling means connected with a portion of said cutter bar remote from said pivot means, and spring pressed locking means cooperating with said coupling means and with a portion of said yoke remote from said pivot means to releasably secure said cutter bar on said yoke in a normal position transversely of the direction of propulsion of the mower, said coupling means including a coupling member engageable by said locking means and an adjustable connection between said coupling member and said remote portion of said cutter bar, whereby said cutter bar may be pivotally adjusted relative to said yoke independently of release of said locking means to vary the lead of said cutter bar.

38. In a mower, a cutter bar yoke, a cutter bar, pivot means connecting said cutter bar with said yoke, a coupling member guided on a portion of said yoke remote from said pivot means for movement in a generally horizontal direction, means on a portion of said cutter bar remote from said pivot means, cooperating with said coupling member to secure said coupling member to said cutter bar in different positions of adjustment of said coupling member longitudinally of said cutter bar, spring pressed locking means cooperating with said coupling member and yoke to releasably secure said cutter bar in a normal position on said yoke transversely to the direction of propulsion of the mower, said spring pressed locking means acting, when subjected to excessive pressure due to the cutter bar encountering an obstruction, to release said coupling member and permit rearward movement of said cutter bar about said pivot means, and a stop on said yoke engageable by said coupling member to limit said rearward movement of said cutter bar.

WILLARD H. TANKE.